United States Patent [19]

Buckley et al.

[11] 4,332,832
[45] Jun. 1, 1982

[54] ANIMAL FOOD AND METHOD

[75] Inventors: Keith Buckley, Melton Mowbray; Ian E. Burrows, Gaddesby; Philip J. Lowe, Dunkirk, all of England

[73] Assignee: Mars Limited, London, England

[21] Appl. No.: 110,245

[22] Filed: Jan. 7, 1980

Related U.S. Application Data

[63] Continuation of Ser. No. 969,234, Dec. 13, 1978, abandoned, which is a continuation of Ser. No. 826,655, Aug. 22, 1977, abandoned, which is a continuation of Ser. No. 698,738, Jun. 22, 1976, abandoned, which is a continuation-in-part of Ser. No. 457,484, Apr. 3, 1974, abandoned.

[51] Int. Cl.$^3$ .............................................. A23K 1/10
[52] U.S. Cl. .................................. 426/641; 426/661; 426/805; 426/646
[58] Field of Search ............... 426/104, 573, 574, 578, 426/641, 643, 644, 646, 657, 465, 805, 661, 560

[56] References Cited

U.S. PATENT DOCUMENTS

| | | | |
|---|---|---|---|
| 982,711 | 1/1911 | Ellis | 426/210 |
| 2,634,211 | 4/1953 | Komarik | 426/371 |
| 2,635,963 | 4/1953 | Glabe | 426/371 |
| 2,860,051 | 11/1958 | Krehl | 426/212 |
| 3,004,852 | 10/1961 | Rothschild | 426/371 |
| 3,115,409 | 12/1963 | Hallinan | 426/805 |
| 3,850,838 | 11/1974 | Guckenberger | 426/103 |

FOREIGN PATENT DOCUMENTS

| | | | |
|---|---|---|---|
| 108809 | 6/1938 | Australia | 426/212 |
| 264199 | 5/1964 | Australia | |
| 278905 | 5/1964 | Australia | |
| 1919835 | 10/1970 | Fed. Rep. of Germany | 426/371 |

OTHER PUBLICATIONS

English Translation of German Patent 1919835.

*Primary Examiner*—Hiram Bernstein
*Attorney, Agent, or Firm*—Davis, Hoxie, Faithfull & Hapgood

[57] ABSTRACT

A rehydratable dry animal food is prepared by preparing a mix of comminuted, heat-treated meaty materials, fat and pregelatinized starch carbohydrate binder, forming the mix into pieces and drying the pieces to form permeable solid pieces which rehydrate to a paste-like material of heterogeneous texture. The mix preferably contains bone fragments, which can be softened by autoclaving and which lend a desirable flaky texture to the rehydrated product. The pregelatinized starch carbohydrate binder may be pregelatinized potato powder or cereal products in which the starch content is in pregelatinized form or other starch containing products in which the starch component has been pregelatinized. Typical mixes contain 70–80% meaty materials, 10% fat and 10–20% of said binder. The pieces may be extruded under low pressure or extrusion-expanded to give an open texture.

4 Claims, No Drawings

ANIMAL FOOD AND METHOD

This application is a continuation of application Ser. No. 969,234, filed Dec. 13, 1978, which was a continuation of application Ser. No. 826,655, filed Aug. 22, 1977, which was a continuation of application Ser. No. 698,738, filed June 22, 1976, which was a continuation-in-part of our prior application Ser. No. 457,484, filed Apr. 3, 1974. These prior applications are now abandoned.

The present invention relates to a food product suitable for domestic animals and more especially for cats and dogs, and to a method of preparing it. In particular it relates to a dry food product that can be hydrated to a palatable material of a heterogeneous paste-like texture acceptable to domestic animals.

Recent work has shown that felines much prefer their food warm, notably at 35°–40° C., as compared with the same food at room temperature. It is inconvenient, however, to serve canned foods at elevated temperatures, and conventional dry foods do not hydrate satisfactorily and so cannot successfully be fed warm by admixture with hot liquid. Furthermore many powdered or dehydrated foodstuffs can only be hydrated or rehydrated with difficulty to give on hydration a product of unattractive texture.

In British Specification No. 1,310,348 there is described a dehydrated meat product prepared from uncooked comminuted meat and a dry comminuted starchy vegetable material such as dehydrated potato. The mix is shaped and heated to set the protein of the meat and form a matrix binding the vegetable material, and the heat-set mix is dehydrated. The shaped product can be rehydrated to simulate freshly cooked intact meat and it is clearly important that it should retain its shape on rehydration. This is the exact opposite of what is required for the present invention, which is a product that will break down to form a heterogeneous paste-like material of particularly high acceptability to domestic animals such as cats.

The present invention now provides a dry food product, suitable for serving after admixture with a heated liquid, which comprises an intimate mixture of comminuted, heat-treated (notably pasteurized or sterilized) meaty materials, fat and pregelatinized starch carbohydrate binder formed into permeable solid pieces that break down on the addition of hot liquid to a paste-like material suitable for feeding to domestic animals. By the term "meaty materials" is here meant the tissues of edible vertebrates, including not only meat, fish and poultry but also meat, fish and poultry offals and by-products, and expecially bone-containing materials as further discussed below.

The product is preferably of low density, being prepared, for example, by a process in which a moist mixture of the ingredients is formed into pieces without densification of the pieces and the pieces are subsequently dried, preferably in a fluid bed drier. The moist mixture may be extruded under low pressure to preserve an open structure, or extruded under high pressure into the ambient atmosphere to achieve expansion of the extruded pieces.

It has been found particularly valuable to include bone fragments in the mixture because these give the dry product an internal structure that facilitates rehydration and the hydrated product a flaky, heterogeneous paste-like texture. This textured product is particularly acceptable to cats and dogs. The bone fragments are usually to be derived from fish or meat bone-containing offal.

The preferred bone-containing material is whitefish head and backbone (commonly containing about 60% bone and 40% tissue) although oily fish head and backbone, rabbit, sheep and chicken bone may also be used. Whole fish may also be employed, especially when small fish such as sprat are being considered. The preferred concentration of the bone-containing meaty material is 70–80% of the weight of the moist mix.

In the removal of edible fish muscle from such fish as cod or herring, considerable quantities of fish heads and backbones are left as a waste material which is normally used in the preparation of dried meals for animal feeding purposes. It has been found that by processing this material in e.g. a steam autoclave the bone fraction is softened and its rehydration properties when incorporated in the product of this invention substantially improved. Similar results are achieved by the use of chicken, rabbit and sheep rib bone.

If the autoclaved fish bone-containing material is ground coarsely and mixed in the cold with a binding agent such as potato granules, and the resultant relatively dry mix extruded, cut into pieces and dried, the finished product not only rehydrates extremely rapidly on the addition of hot water but also breaks down to give a flaky, heterogeneous-textured paste. The addition of a low percentage of fat, such as lard, enhances the rehydration properties of the product and also improves its pet animal acceptance.

Additives such as vitamins, minerals, anti-oxidants and colouring matter may be added at the mixing stage. The addition of food acidulants, such as citric acid or citrates or phosphoric acid, to the mix also improves the rehydration properties and cat acceptance. Other additives, such as gluten strips or textured soya granules, may be included to give further heterogeneous texture. A low pressure extrusion process is also advantageous since this induces a low density, loosely structured product into which the rehydration water can readily penetrate, and also maintains a coarse structure in the rehydrated product.

Alternatively the mouldable mix may be passed through a high pressure/high temperature extruder, e.g. of the Anderson or Wenger type, which causes expansion of the extruded pieces by a puffing action and thus facilitates rehydration of the dried product.

It is preferable to dry the product in a fluid bed drier which gives good rehydration properties and appearance, although other methods such as microwave cooking, vacuum oven or normal baking techniques may be employed. The preferred moisture content of the final dried product is below 15% and more especially 7–8%.

Sterilization of the bone-containing material is preferably effected in an autoclave at 21 p.s.i. for about 45 minutes. Other cooking methods, such as prolonged boiling, can be employed to soften and pasteurize the bone-containing material.

The binder should be one that allows the product pieces to break down under the action of hot water. For this reason it is preferably a material consisting essentially of pregelatinised starch and more especially potato granules or potato flour, which all contains starch or ceral products such as rusk granules in pregelatinized form due to heat during processing. The preferred concentration of potato granules or rusk granules is 10–20% by weight of the mix.

It is preferable to add up to about 10% extraneous fat such as lard, but this is not essential or smaller amounts can be added, especially when using high fat 'bone-containing materials.

The bone fragments preferred for use in this invention are fragments of heterogeneous size and shape such as are produced when bone-containing meaty materials are minced, especially after autoclaving, rather than uniform powderd bone, such as conventional bone meal.

The preferred fragments assist in penetration of the final product by hot water during serving and modify the texture of the wetted product.

In the preferred practice of this invention whole whitefish head and backbone are steam autoclaved and then passed through a mincer. A major portion of cold minced fish head and bone is mixed in a bowl mixture by a dough hook with minor proportions of lard and pregelatinized potato granules, together with salt, dyestuff and tomato puree. The mix is passed through a mincer modified by the removal of the impeller blade so as to minimise compression at the extrusion plate. The extruded 'worms' are cut into pieces and then dried in a fluidised bed drier for 20 minutes at 100° C. to about 8% moisture.

The dried and cooled product is then sealed into suitable containers such as plastic pouches or cartons lined with a grease-resistant liner. Where materials containing oils prone to oxidative rancidity are used, e.g. herring head and backbone, butylated hydrosyanisole may be added to the mix and/or the product sealed under an atmosphere of nitrogen.

The following examples illustrate the invention.

EXAMPLE 1

Whole whitefish head and backbone was autoclaved for 45 minutes at 21 p.s.i. and then passed through a mincer fitted with a 1 cm. plate.

Seventy-six parts by weight of the minced material were mixed in the cold in a bowl mixer with a dough hook with 10 parts of potato granules, 10 parts of lard, 1 part of salt, 1 part of mixed dyestuff solution and 2 parts of tomato puree.

The cold mixture was passed through a mincer fitted with a 1 cm. plate which had been modified by the removal of the impeller blade. The extruded worms were cut off into half-inch lengths and dried in a fluid bed drier for 20 minutes at 100° C. to a moisture content of 8%. The product was allowed to cool and then sealed into clear plastic pouches.

On adding two parts by weight of boiling water to one part of the product and gently mixing by hand it was found that the product pieces rapidly disintegrated and rehydrated within one minute to produce an attractive fish paste with a flaky heterogeneous texture and a pleasant fishy aroma. The rehydrated product was found to have a high acceptance by cats especially when fed warm, and contained 11% protein, 8% fat and 7% carbohydrate.

EXAMPLE 2

Whole degutted herring was autoclaved for 45 minutes at 21 p.s.i. and then passed through a mincer fitted with a 1 cm. plate.

Seventy-nine parts by weight of the minced material were mixed in the cold in a bowl mixer with a dough hook with 9 parts of potato granules, 10 parts of beef suet fat, 2 parts of tomato paste, colouring agents and sufficient water to produce a fairly dry but mouldable mixture.

The mixture was extruded as given in Example 1 and then dried in a vacuum oven at 29 inches of mercury vacuum and 55° C.

On addition of two parts by weight of boiling water to one part of the product and gently mixing by hand it was found that the product rehydrated less quickly than in Example 1 and had a smoother, less flaky texture.

EXAMPLE 3

A whole chicken skeleton with adhering flesh was autoclaved for 45 minutes at 21 p.s.i. and then ground through a mincer fitted with a 4 mm. plate.

Eighty parts by weight of the minced material were mixed in a bowl mixer fitted with a dough hook, with 9% potato granules, 9% rice flakes and 2% of a 50% caramel solution.

The cold mixture was passed through a mincer fitted with a 4 mm. plate which had been modified by the removal of the impeller blade. The extruded worms were cut off into half-inch lengths and dried in a fluid bed drier for 20 minutes at 100° C. The product was allowed to cool and then sealed into clear plastic pouches.

On the addition of two parts of boiling water to one part by weight of the product and gently mixing by hand it was found that the product rehydrated within one minute to a granular meat paste with a pleasant meaty aroma.

EXAMPLE 4

Whitefish head and backbone was passed through a mincer fitted with a 1 cm. plate and then autoclaved for 30 minutes at 20 p.s.i. The autoclaved material was then homogenised to a cream-like paste in a high speed homogeniser.

Eighty-one parts by weight of the homogenised fish were mixed in the cold in a bowl mixer with ten parts of rusk granules, five parts of lard, two parts of tomato paste, one part of salt and one part of mixed dyestuff solution.

The cold mixture was passed through a mincer fitted with a 1 cm. plate which had been modified by the removal of the impeller blade. The extruded 'worms' were cut into half-inch lengths and dried as described in Example 1.

On adding two parts by weight of cold water to one part of the product and gently mixing by hand it was found that the product pieces rapidly disintegrated and rehydrated within one minute to produce a paste with a granular texture.

EXAMPLE 5

A product was prepared as described in Example 4 except that the whitefish head and backbone was replaced by cod fillets.

The product was found to rehydrate more slowly than that of Example 4 but gave a paste of similar appearance.

EXAMPLE 6

Whitefish head and backbone was passed through a mincer fitted with a 1 cm. plate and then autoclaved at 20 p.s.i. for 30 minutes.

Seventy-one parts by weight of the minced cooked fish were mixed in the cold with 15 parts of fine ground rusk, 10 parts of lard, 2 parts of tomato paste, 1part of salt and 1 part of dye solution.

The mix was fed into an extruder, fitted with a 1 cm. die plate, the barrel of which was heated by high pressure steam, and the extruded worms were cut into 1 cm. lengths at the die face and dried by passing through a steam-heated steel band oven. An expansion of 20% in product volume was achieved at the die face and this was found to assist rehydration properties.

We claim:

1. A rehydratable dried food having an average moisture content of less than 15% by weight adapted to be served for animal consumption as a soft, moist, comestible product upon the addition of liquid, said product comprising cooked bones, cooked animal tissue, and fat in quantity to enhance rehydration capability, the product being bonded together in the form of extruded pieces by pregelatinized starch as a binder, the bones being softened by cooking and coarsely ground into bone fragments of heterogeneous size and shape present in sufficient quantity to enhance liquid permeability of the dried product, the binder being softenable and disintegratable upon permeation of the dried product by liquid.

2. The process of preparing food for serving to domestic animals which comprises adding liquid to the rehydratable dried food as defined in claim 1 to permeate said pieces, thereby causing said binder to disintegrate and forming a soft, moist, heterogeneous food.

3. The process of preparing a rehydratable dried food for serving to domestic animals as a soft, moist comestible product upon the addition of liquid which includes the steps of extruding pieces of a rehydratable mixture of coarsely ground cooked bones and cooked meat admixed with fat and pregelatinized starch as a binder, the ground cooked bones being present as fragments of heterogeneous size and shape in quantity sufficient to enhance rehydratability of the product, drying the pieces so formed to enhance their shelf life, whereby the product can be served as a soft, moist heterogeneous food by admixture with liquid permeating the dried pieces and disintegrating the binder.

4. The process of producing a rehydratable, dried animal food including the steps of subjecting bone-containing meat to moist cooking thereby softening the bone content, coarse grinding the cooked bone-meat mixture to produce bone fragments of heterogeneous size and shape, adding to the bone-meat mixture a quantity of fat and from 10–20% by weight pregelatinized starch, forming the mixture into pieces of desired size by extrusion thereof to enhance porosity, and extracting water from the extruded pieces to form dried pieces having an average moisture content of less than 15% by weight, the said pieces being permeable by liquid and having their components bonded together by pregelatinized starch softenable and disintegratable upon permeation of the dried pieces by hot liquid.

* * * * *